United States Patent Office 3,303,085
Patented Feb. 7, 1967

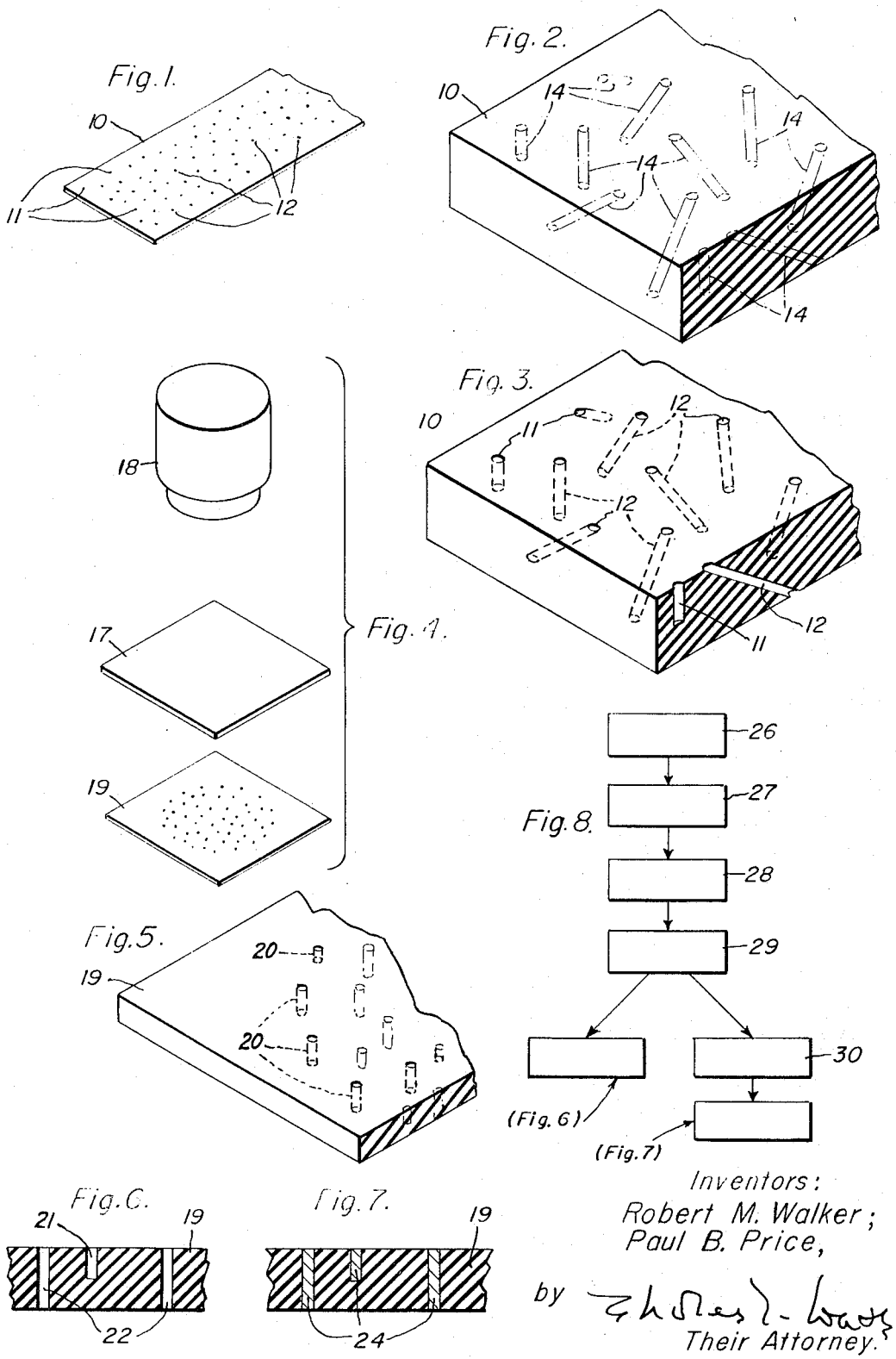

3,303,085
MOLECULAR SIEVES AND METHODS FOR
PRODUCING SAME
Paul B. Price, Scotia, and Robert M. Walker, Delanson,
N.Y., assignors to General Electric Company, a corporation of New York
Filed Feb. 28, 1962, Ser. No. 176,320
12 Claims. (Cl. 161—109)

The present invention relates generally to the charged particle radiation art and is more particularly concerned with the use of charged particles to produce articles having straight-through openings or apertures of uniquely small cross-sectional dimension and is also concerned with novel composite bodies in which one component material is distributed through the matrix material in the form of rod-like deposits which are similarly of substantially straight longitudinal axes and uniquely small cross-sectional dimension. Additionally, the invention is concerned with new methods by which these novel articles and composite bodies can be produced through a novel combination of radiation and chemical means and techniques.

It has long been recognized that a thin sheet-like body having straight-through openings of extremely small size would have a number of potentially important uses. Porous bodies such as expanded Vycor tubing and certain filter papers have through openings or apertures of minimum cross-sectional dimension of the order of 30 angstroms but their utility has been quite limited because they cannot be produced with straight-through apertures. Other bodies produced in accordance with the prior art in an effort to secure the desired fluid flow characteristics in extremely fine filter elements have invariably proven deficient in respect to minimum cross-sectional dimensions of the openings, it being impossible heretofore in accordance with any known prior art means or method to make a material or drill a body to form holes therein of the extremely small size required to satisfy this demand. Thus, electrostatic means and ultrasonic means have failed to produce openings in any material of any thickness which are of the order of magnitude of the pores or openings in expanded Vycor tubing and the finest filter papers. To the best of our knowledge, the minimum cross-sectional dimension of openings produced by such prior art means is between 30,000 and 40,000 angstroms.

By virtue of the present invention, which is predicated upon our surprising discoveries subsequently to be described in detail, openings or apertures can be formed in sheets of natural and artificial mica and other materials to produce devices fully meeting the foregoing demand. Further, in accordance with this invention, apertures of substantially uniform size may be produced and these apertures may, as desired, be distributed either in random pattern or with their axes generally substantially parallel to each other. In addition, composite bodies may be made by partially or completely filling these recesses and openings with selected materials for a wide variety of special purposes and uses.

One of the discoveries forming the basis for this invention is that under certain critical circumstances, radiation damage effects can be combined with selective chemical action to remove from solid bodies extremely small diameter cores leaving deep, generally straight-line bores in the form of recesses and apertures. Thus, we have found that in certain materials the damaged portions resulting from the passage of a heavy charged particle through the mass can be dissolved and leached from the mass and that this can be done controllably and rapidly to produce recesses and apertures in the body of a wide range of cross-sectional dimensions. Further, by masking the target body, the orientation of the axes of the resulting bores with respect to any given portion of the body can be preselected. Similarly, by selecting the mask, the charged particle source, or the target body thickness, the proportion of recesses to apertures may be predetermined within limits.

In respect particularly to the leaching operation of this invention, we have found that in a mica sheet, for example, it is possible to produce openings of considerably greater size than the original disturbed area or particle-damage "track." This is accomplished by virtue of the fact that the special etchant used has a strong directional effect in mica and will attack and dissolve the mica mass parallel to the layer planes at a vastly greater rate than perpendicular to them. On the other hand, we have found that openings somewhat smaller in cross section than these tracks can be produced in a duplex variation of the process of this invention according to which an annealing step is carried out prior to contacting the workpiece with etchant solution. The annealing step serves to "repair" the damaged portion or "track," and thus the cross section of the ultimate aperture or recess can be selected by controlling the extent of damage repair and appropriately adjusting the annealing conditions.

For some purposes, the unetched body may find utility since there is no tendency for the tracks to become erased or obliterated or repaired during the course of use or storage. Specifically, we contemplate, for example, the use of an irradiated mica sheet as a kind of semi-permeable membrane for the separation of molecules of different sizes or weights. Smaller molecules thus may be separated from larger ones in a mass by virtue of the fact that the "tracks" will be permeable through the thickness of the sheet to the smaller or lighter molecules but will be impermeable to the larger or heavier ones. For maximum effectiveness, a filter of this type will have apertures which are substantially aligned in the sheet and disposed perpendicularly to the top and bottom surfaces thereof.

We have further discovered that in certain materials recesses may be developed into apertures through an action of erosion or etching and leaching with certain special chemical agents. Accordingly, we contemplate a process which would include two separate and different etching stages and would thus permit the use of charged particles of lower energy level or the drilling of substantially thicker sheet materials.

Described broadly and generally, an article of this invention is a solid body which has a plurality of recesses and apertures of minimum cross-sectional dimensions between about five angstroms and about 20,000 angstroms. These recesses and apertures may or may not be aligned, that is, disposed with their longitudinal axes substantially parallel to each other, but in all instances the recesses and apertures will be straight bores as distinguished from the tortuous passageways characteristic of the expanded Vycor and filter paper articles of the prior art. Another type of article of this invention is produced by filling these recesses and apertures. The resulting composite body comprises a matrix and a filler of a material different from the matrix in the form of a plurality of separate rod-like deposits embedded in the matrix and having minimum cross-sectional dimensions between about five and about 20,000 angstroms. Again, however, the rod-like deposits which are produced in accordance with this invention method by filling the recesses and apertures of the aforesaid novel article will extend in essentially straight lines into the body and will therefore be of substantially generally cylindrical form.

In its method aspect, this invention again generally described comprises the steps of subjecting a body, suitably in sheet form, to a source of heavy energetic charged particles and thereby producing particle tracks within the body, and then removing from the body over the full length of the tracks a portion of the material defining those tracks. In a preferred practice of this invention, substantially all the track-defining material will be removed from the body either by etchant action alone or by combination of annealing and etchant action, with the result in any event that openings or apertures all the way through the body will be produced and these apertures will be of substantially uniform cross-sectional area in each instance throughout the length of the aperture. Also, according to our preference, the holes for apertures will be aligned or disposed with their axes in parallel relation to each other by first appropriately masking the body. In some cases, the cross-sectional area of the holes will be enlarged, again substantially uniformly throughout the body by carrying out a second etching action following the removal of all the track-defining material from the body. For special purposes, separate etching steps may be employed to produce deep recesses in relatively thick sheets of material and then to convert these recesses into apertures.

Those skilled in the art will gain a further and better understanding of the present invention from the detailed description set forth below, considered in conjunction with the drawings accompanying and forming a part of the specification, in which:

FIG. 1 is a fragmentary, perspective view of an article embodying this invention comprising a mica sheet having a large number of very small holes formed in it and thus being suitable for use as a molecular sieve;

FIG. 2 is an enlarged fragmentary view of the article of FIG. 1 in an intermediate stage of its production and showing heavy energetic charged particle tracks distributed at random within and in some instances extending through the mica sheet;

FIG. 3 is a view similar to FIG. 2 showing the FIG. 1 body after the track-defining portions of the body have been removed by chemical action, leaving recesses in the body and apertures extending through the body and opening on the top and bottom surfaces thereof;

FIG. 4 is a composite view in perspective illustrating the use in accordance with the method of this invention of a source of heavy energetic charged particles and a shield or mask for the production of a body having a large number of small apertures disposed with their longitudinal axes substantially parallel;

FIG. 5 is a fragmentary, enlarged, perspective view of an article produced by the FIG. 4 system, the charged particle tracks having been leached from the body leaving voids in the form of recesses and apertures with axes substantially perpendicular to the top and bottom surfaces of the mica sheet;

FIG. 6 is a fragmentary, cross-sectional view of the article of FIG. 5 showing the typical recesses and apertures therein;

FIG. 7 is a view similar to FIG. 6 showing the recesses and apertures filled with non-micaceous material extending as rod-like bodies in some instances from face to face of the mica matrix and having exposed portions in the surfaces of the mica sheet; and FIG. 8 is a flow sheet illustrating the novel process of this invention for producing articles of FIGS. 3 and 5 and a variation of this process for producing bodies like that of FIG. 7.

The sheet of mica 10 illustrated in FIG. 1 has been provided with a large number of the very small straight-through recesses 11 and apertures 12 characteristic of the articles of this invention. While sheet 10 is shown in approximately full size, it will be understood that the size of the recesses has been greatly exaggerated for the purposes of illustration, particularly to show their random distribution across the length and breadth of the sheet. Sheet 10 is a natural mica body having a uniform thickness of approximately five microns which is in accordance with our present preference in articles of this invention. Those skilled in the art, however, will understand that in sheets of thickness from one micron to 100 microns or more, the limiting factors, aside from the uses to which the finished article is to be put, are the availability and cost in the case of the thinner bodies and the difficulty of producing apertures in the density required in the case of the thicker bodies. Also, it is to be understood that recesses 11 and apertures 12 may vary in minimum cross-sectional dimension from approximately five angstroms to approximately 20,000 angstroms, again depending upon the purposes for which the body is intended to be used. In the case of body 10, apertures 12, in accordance with our present preference, have a minimum cross-sectional dimension of about 30 angstroms and all these apertures are substantially the same in this dimensional respect and all of them, as in the general case, are of substantially the same cross-sectional area. Thus, whether the apertures are relatively small, as in this case, or are quite large, they will all be of approximately the same cross-sectional size and as indicated above and set out in the appended claims, they will all be "straight-through" apertures in that they will have axes which extend in substantially straight lines as distinguished from the tortuous lines described by the apertures in the 30 angstrom-opening expanded Vycor and filter paper bodies previously described. Still further, while apertures 12 are indicated in FIGS. 2 and 3 as extending in random directions through body 10, as will subsequently be described in detail, these may be aligned or, more precisely, disposed in parallel orientation in respect to their longitudinal axes where the intended use would better be served by such an arrangement.

FIGS. 2 and 3 illustrate steps in the production of article 10, FIG. 3 showing that product following the second or chemical treatment step, while FIG. 2 shows it at an intermediate stage of production immediately following the irradiation step of the present invention process. As a result of the irradiation of body 10 by heavy energetic charged particles, a plurality of randomly-distributed but straight-through "tracks" 14 are produced in body 10. These tracks in some cases extend all the way through body 10 from its top surface to its bottom surface, with the result that the track-defining material, which may be a decomposition product of the original mica, is exposed at both the top and the bottom surfaces of the sheet. Thus, by subjecting body 10 in the FIG. 2 stage to contact with a suitable etchant solution effective to selectively dissolve and remove the track-defining material, recesses 11 and apertures 12 are produced at every location where tracks 14 originally were present. Depending upon the etchant employed, recesses 11 and apertures 12 may be of essentially the same cross-sectional area throughout their lengths as the tracks 14 of FIG. 2 or they may be of considerably greater cross-sectional area than those tracks but, in any event, will in general be of uniform cross-sectional area throughout their lengths and across the width and breadth of the sheet. As another variation, however, as indicated previously, these recesses and apertures may be of somewhat smaller minimum cross-sectional dimension and cross-sectional area than tracks 14. Their individual dimensions and the relationship of the cross-sectional dimensions of the apertures, however, will again be essentially uniform in the finished product. In still another form of this invention, the apertures may be of varying cross section through the thickness of the sheet as a result of the non-uniform tracks produced by the passage of relatively low energy charged particles through the target body or workpiece.

It will also be understood that recesses 11 produced by partial penetration of heavy energetic charged particles into body 10 and subsequent leaching the resulting short track may be developed into apertures by selection of a second etchant which attacks perpendicularly to the layer planes much more rapidly than parallel to them. Thus, in this chemical step, the sidewalls of the recesses are essentially impervious to the etchant, while the floor of the recesses are rapidly attacked and dissolved away, producing apertures of approximately uniform cross-sectional area throughout the thickness of the sheet.

Using a source of heavy energetic charged particles generated by subjecting uranium sheet 17 to neutron source 18, mica sheet 19 may be irradiated through a mask or shield (not shown) in the form of an aluminum sheet so that the resulting tracks and recesses and apertures are disposed with their longitudinal axes substantially parallel to each other. Alternatively, as shown in FIG. 4, sheet 19 may be disposed at a distance from uranium sheet 17 so that only fission fragments traveling paths paralleling the direct line between sheets 17 and 19 will collide with the mica sheet. Also, as indicated in FIGS. 5 and 6, tracks 20, recesses 21 and apertures 22 will be disposed with their axes substantially perpendicular to the planar top and bottom surfaces of sheet 19.

The assembly, including workpiece 19 and uranium sheet 17, is disposed in an evacuated chamber (not shown) into which neutrons from source 18 are directed so as to produce U–235 fission fragments which pass unimpeded through the evacuated region and enter sheet 19, producing radiation damage tracks which, as previously described, are subsequently leached out to provide the desired apertures. An advantage of this arrangement over the use of a shield is that particles of lower energy can be used or thicker workpiece sheets can be processed without providing higher energy particles. An offsetting disadvantage is that a vacuum chamber means is required.

In a variation on the FIG. 4 system, it is contemplated and in some cases preferred to use oxygen ions to produce the radiation effects necessary to the production of the articles of this invention by subsequent chemical drilling action. Oxygen ions, unlike U-235 fission fragments, are generated in beams and no shield or evacuated space separation is required to assure the production of aligned recesses and apertures in the finished body. Further, where the mica sheet is only about one micron thick, oxygen ions of the level of about five m.e.v. will penetrate to produce damage tracks running entirely through the sheet. Oxygen ions of 100–150 m.e.v. will be effective to penetrate all the way through mica sheets of thickness approximating 100 microns.

A source of alpha particles or particles heavier than alpha particles and ions heavier than oxygen ions may be employed in accordance with this invention. Again, the selection of the other components of the FIG. 4 assembly is appropriately made and the shield is either being retained, withdrawn, or substituted by appropriate geometircal arrangement of the source and the workpiece, depending upon whether a FIG. 3 or FIG. 5 product is desired. However, in the case of the oxygen ions and similar alpha particles and other relatively low energy ions or charged particles, the ratio of apertures to recesses or blind apertures in the finished product will be quite low, numbering up to the order of one in 10,000 in a typical oxygen ion irradiation. Again, however, it will be understood that many of the blind apertures may be extended through to the opposite face of the sheet by carrying out the duplex etching operation of this invention.

In FIG. 6, the recesses 21 and apertures 22 are shown as being open, whereas in FIG. 7 they are illustrated as being filled with a material 24 other than mica which extends in rod-like deposits in the sheet and completely fills the voids and is therefore exposed at either or both the top and bottom surfaces of the sheet. The manner in which such filling is accomplished and the materials which are preferred for use in this manner are set out in detail below.

The process of this invention has two general variations, as illustrated in the flow sheet of FIG. 8, and contemplates in this typical case the production of a product such as that of FIG. 1 or FIG. 6, and the production of the alternative product of FIG. 7. A mica sheet is preferred presently as the workpiece and it is subjected to U-235 fission fragment irradiation as the first step 26 of the process. As the next step 27, it is then contacted with a solution of hydrofluoric acid, suitably a 20 percent solution, so that the track-defining material is selectively dissolved or leached and removed from the mica sheet. As an alternative, aqua regia and certain other acids may be employed, and more concentrated or more dilute HF solutions will give good results but the 20 percent HF solution has been found to combine economy and etching rate and convenience-of-handling advantages better than such alternatives. The water-rinsing step 28 is included in the flow sheet for stopping the reaction and cleaning the corrosive and dangerous HF solution from the product. The second leaching step 29 is alternative, being employed only where it is desired to extend the depth of recesses formed in the mica sheet. Where the filled product illustrated in FIG. 7 is to be produced, an impregnation step 30 is necessary and completes the process except for any finishing operation that may be desired to better fit the filled product for its final intended purpose. Thus, for example, surface portions of the top and bottom of sheet 19 may be polished or abraded so as to assure exposure of the deposit 24 for electrical contact purposes.

The following illustrative, but not limiting, examples of this invention are offered to inform those skilled in the art of the precise details of representative embodiments or practices of the invention:

*Example I*

A sandwich of aluminum, natural uranium and natural (muscovite) mica is exposed to thermal neutrons in a reactor of the specifications as to neutron flux of the Brookhaven reactor. The uranium sheet is of thickness approximating two microns while the aluminum and mica sheets are approximately 100 microns thick. After one minute of exposure, the sandwich is removed from the reactor and the mica sheet is separated from the aluminum and uranium sheets enclosing it. Flakes about 2000 angstroms thick are removed from the mica sheet and fission fragment tracks can be observed by transmission electron microscopy. These tracks are observed to be about 25 angstroms in diameter, which corresponds to about 0.04 percent of the surface area for the approximately $10^{10}$ tracks per square centimeter produced in this exposure. The flakes are immersed in a 20 percent aqueous solution of hydrofluoric acid at about 100° F. Flakes are removed from this etchant solution at intervals after a few seconds immersion time, and rinsed with water to remove adhering acid and arrest etchant action. The thus-prepared flakes are observed to have many apertures running straight through them. The diameters or minimum cross-sectional dimensions of these openings are found to vary according to the length of time of contact of the flakes with etchant solution, the etchant action continuing beyond the point of complete removal of "track"-defining material. Thick flakes about 10 microns thick are removed from the mica sheet and given the same etching treatment as above. Holes running completely through the 10 micron sheets are now observed in the electron microscope and by inference recesses are also present.

*Example II*

In an operation generally the same as that of Example I, a 100 micron-thick sheet of natural mica (phlogopite) is exposed to fission fragments generated by subjecting a sheet of uranium about two microns thick to the neutron flux of the reactor described in Example I. By virtue of the spacing between the mica and uranium sheets, i.e., approximately three inches, only fission fragments traveling substantially directly toward the mica sheet will reach and penetrate it. Thus, tracks are observed in the mica which are substantially parallel to each other and at right angles to the top and bottom surfaces of the mica sheet. Etching is accomplished as described in Example I and then following the water-rinsing step, the mica flakes are immersed in a 5 percent aqueous solution of caustic soda at about 100° F. for five minutes. Deepening of the recesses in the mica flakes results in actual conversion of some recesses into apertures without, however, attendant perceptible enlargement of the cross-sectional dimensions of the original apertures and recesses in the flakes.

Those skilled in the art will understand that the devices of this invention have a wide variety of potential uses. Thus, they may be used as molecular sieves, i.e., to separate molecules of different sizes such as proteins, high polymers, and viruses. Likewise, they may be used for water purification, as a calibrated leak for vacuum systems, and as a collimator to produce point sources of various types of radiation, i.e., low energy electron beams. In the embodiment illustrated in FIG. 7, these new devices may be filled with superconductive material or with iron particles to produce oriented, single-domain ferromagnetic sheet. They may also be filled to make them suitable for use as an imaging surface for television camera applications.

Having thus described this invention in such full, clear, concise and exact terms as to enable any person skilled in the art to which it pertains to make and use the same, and having set forth the best mode contemplated of carrying out this invention, we state that the subject matter which we regard as being our invention is particularly pointed out and distinctly claimed in what is claimed, it being understood that equivalents or modifications of, or substitutions for, parts of the specifically described embodiments of the invention may be made without departing from the scope of the invention as set forth in what is claimed.

What we claim as new and desire to secure by Letters Patent of the United States is:

1. The method of forming apertures in a solid body which comprises the steps of subjecting the body to a source of heavy energetic charged particles and thereby producing charged particle "tracks" running entirely through the body, annealing the body and thereby partially obliterating the "tracks," and then dissolving and removing from the body substantially all the material defining the resulting residual "tracks."

2. The method of forming apertures in a solid body which comprises the steps of subjecting the body to a source of heavy energetic charged particles and thereby producing charged particle "tracks" running entirely through the body, dissolving and removing from the body all the material defining the "tracks," and then enlarging the diameter of the resulting openings through the body by dissolving and removing portions of said body surrounding the apertures.

3. The method of forming apertures in a solid body which comprises the steps of subjecting the body to a source of heavy energetic charged particles and thereby producing charged particle "tracks" running inwardly of the body from one surface toward another of said body, and then dissolving and removing from the body substantially all the material defining the "tracks."

4. The method of making a porous sheet or plate-like natural mica body in which the pores each extend entirely through the body and open through opposite sides of said body and the pores are all arranged in substantially parallel relation to each other which comprises the steps of bombarding one side of said body with heavy energetic charged particles traveling in substantially parallel paths normal to the entering surface of the body and in a predetermined pattern relative to the mica body, thereafter contacting the said body with hydrofluoric acid and thereby dissolving and removing from said body substantially all charged particle "track"-defining material, and finally rinsing the resulting porous mica sheet and removing therefrom adhering etchant acid solution.

5. The method of making a porous natural mica sheet in which pores extend entirely through the sheet and open on opposite sides thereof which comprises the steps of placing the mica sheet in a position opposed to a sheet of uranium and establishing a vacuum in the space between the opposed sheets, subjecting the uranium sheet to a neutron flux, thereafter contacting the mica sheet with hydrofluoric acid solution and thereby dissolving and removing from the said mica sheet substantially all the charged particle "track"-defining material, and finally rinsing the mica sheet and removing therefrom adhering etchant acid solution.

6. The method of making a porous sheet or plate-like mica body in which the pores each extend entirely through the body and open through opposite sides of said body and the pores are all arranged in substantially parallel relation to each other which comprises the steps of exposing one side of said body to energetic particles selected from the group consisting of particles at least as heavy as alpha particles and ions at least as heavy as oxygen ions traveling in substantially parallel paths, and thereafter contacting the said body with hydrofluoric acid solution and thereby dissolving and removing from said body substantially all fragment "track"-defining material.

7. The method of making a porous sheet or plate-like mica body in which the pores each extend entirely through the body and open through opposite sides of said body and the pores are all arranged in substantially parallel relation to each other which comprises the steps of bombarding one side of said body with heavy energetic charged particles traveling in substantially parallel paths in a predetermined pattern relative to the mica body, thereafter contacting the said body with hydrofluoric acid and thereby dissolving and removing from said body substantially all charged particle "track"-defining material to produce deep pores in the body, rinsing the mica sheet and removing therefrom adhering etchant acid solution, then contacting the mica sheet with an alkali solution and dissolving and removing mica from the body and extending the depth of some of the pores to the opposite surface of the sheet.

8. The two-stage etching method of making a porous sheet or plate-like mica body in which the pores each extend entirely through the body and open through opposite sides of said body and the pores are all arranged in substantially parallel relation to each other which comprises the steps of exposing one side of said body to heavy energetic charged particles, thereafter contacting the said body with a first etchant and thereby dissolving and removing from said body substantially all charged particle "track"-defining material and leaving blind recesses in the body, then extending and deepening some of the recesses to the opposite surface of the body by contacting said body with a second etchant.

9. A body suitable for use as a molecular sieve comprising a sheet having a plurality of straight-through apertures opening through the top and bottom surfaces of the sheet, said apertures being of minimum transaxial dimension between about five and about 20,000 angstroms.

10. A body suitable for use as a molecular sieve comprising a mica sheet from about one to about 15 microns thick having a plurality of apertures opening through the top and bottom surfaces of the sheet, said apertures being of substantially uniform transaxial area and of predetermined minimum cross-sectional dimension between about 30 and about 20,000 angstroms and disposed with their axes substantially at right angles to the top and bottom surfaces of the sheet.

11. As an article of manufacture, a solid body having a plurality of recesses and apertures of minimum transaxial dimension between about five angstroms and about 20,000 angstroms, said recesses and apertures having axes which are substantially straight throughout their lengths.

12. As an article of manufacture, a composite body comprising a mica matrix in the form of a sheet and a nonmicaceous filler in the form of a plurality of separate solid rod-like deposits embedded in the matrix with their ends exposed at the top and bottom surfaces of the sheet and with their axes disposed substantially at right angles to said surfaces and said deposits having minimum transaxial dimensions between about 30 and about 20,000 angstroms.

References Cited by the Examiner

UNITED STATES PATENTS

| | | | |
|---|---|---|---|
| 2,799,637 | 7/1957 | Williams | 156—7 |
| 2,920,038 | 1/1960 | Feldbauer et al. | 55—389 |
| 2,989,385 | 6/1961 | Gianola et al. | 204—154 |
| 3,024,867 | 3/1962 | Milton | 55—389 |
| 3,024,868 | 3/1962 | Milton | 55—389 |

EARL M. BERGERT, *Primary Examiner.*

HAROLD ANSHER, ALEXANDER WYMAN,
*Examiners.*